US012586456B2

(12) United States Patent
Sadaksharam et al.

(10) Patent No.: US 12,586,456 B2
(45) Date of Patent: Mar. 24, 2026

(54) SYSTEMS AND METHODS FOR PROVIDING SECURITY SYSTEM INFORMATION USING AUGMENTED REALITY EFFECTS

(71) Applicant: Tyco Fire & Security GmbH, Neuhausen am Rheinfall (CH)

(72) Inventors: Saravanabavanandam Sadaksharam, Tamil Nadu (IN); Kannan Meiappan, Redmond, WA (US); Shiv Kumar Nadikuda, Clarksville, TN (US); Shashank Velagala, Eden Prairie, MN (US); Sriram Krishnan, Mckinney, TX (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 550 days.

(21) Appl. No.: 17/870,301

(22) Filed: Jul. 21, 2022

(65) Prior Publication Data

US 2024/0029542 A1     Jan. 25, 2024

(51) Int. Cl.
*G06V 20/20*      (2022.01)
*G06V 20/52*      (2022.01)
*G08B 26/00*      (2006.01)

(52) U.S. Cl.
CPC ........... *G08B 26/008* (2013.01); *G06V 20/20* (2022.01); *G06V 20/52* (2022.01)

(58) Field of Classification Search
CPC .................................................. G06T 19/006
See application file for complete search history.

(56) References Cited

U.S. PATENT DOCUMENTS

| | | | | | |
|---|---|---|---|---|---|
| 10,854,055 | B1 * | 12/2020 | Cornell | ................ | G08B 29/186 |
| 11,527,148 | B1 * | 12/2022 | Volkerink | .............. | G08B 25/10 |
| 2005/0228708 | A1 * | 10/2005 | Catala | ................ | G06Q 10/0631 700/111 |
| 2006/0265664 | A1 | 11/2006 | Simons et al. | | |
| 2015/0161821 | A1 * | 6/2015 | Mazula | ................ | G06T 19/006 345/419 |

(Continued)

FOREIGN PATENT DOCUMENTS

| | | |
|---|---|---|
| EP | 3062297 A1 | 8/2016 |
| WO | 2015183427 A1 | 12/2015 |

OTHER PUBLICATIONS

International Search Report in PCT/US2023/070522, mailed Nov. 15, 2023, 4 pages.

*Primary Examiner* — Di Xiao
(74) *Attorney, Agent, or Firm* — ArentFox Schiff LLP

(57) ABSTRACT

Example implementations include a method, apparatus and computer-readable medium for providing security system information using an augmented reality (AR) effect, comprising receiving security system information from at least one security device in an environment, wherein the security system information is of a first type of security event. The implementations further include selecting, from a plurality of AR effects, a first AR effect that is configured to output information of the first type. Additionally, the implementations further include determining a three-dimensional location in the environment that is associated with the security system information. Additionally, the implementations further include generating, for display on a user interface, an AR object of the first AR effect at the three-dimensional location.

20 Claims, 6 Drawing Sheets

400

Receiving security system information from at least one security device in an environment, wherein the security system information is of a first type of security event — 402

Selecting, from a plurality of AR effects, a first AR effect that is configured to output information of the first type — 404

Determining a three-dimensional location in the environment that is associated with the security system information — 406

Generating, for display on a user interface, an AR object of the first AR effect at the three-dimensional location — 408

(56) References Cited

U.S. PATENT DOCUMENTS

2018/0330544 A1* 11/2018 Corso ................... G06T 19/006
2019/0080170 A1*  3/2019 Baca ...................... G06V 20/70
2020/0090409 A1*  3/2020 Fink ...................... G06T 19/006
2023/0139739 A1*  5/2023 Brown ................. B60K 35/213

* cited by examiner

100

400

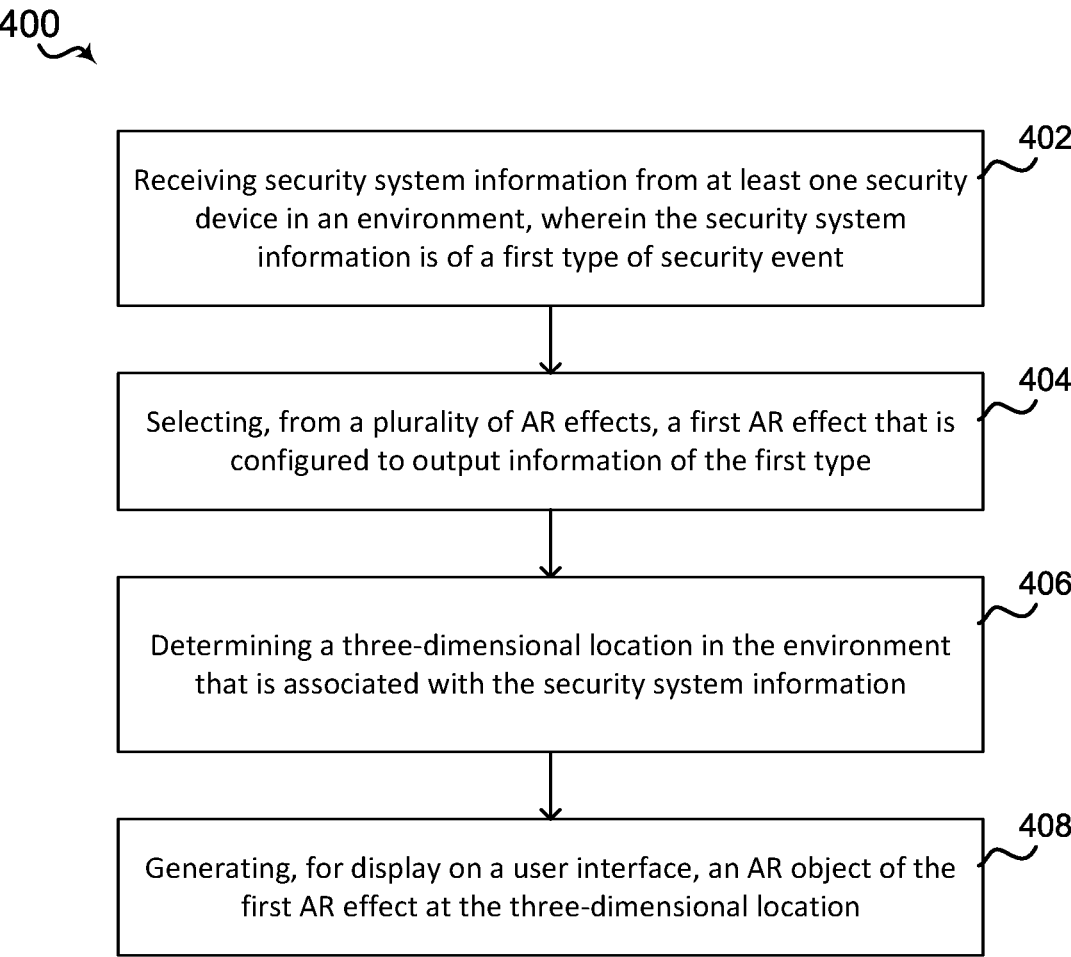

402

Receiving security system information from at least one security device in an environment, wherein the security system information is of a first type of security event

404

Selecting, from a plurality of AR effects, a first AR effect that is configured to output information of the first type

406

Determining a three-dimensional location in the environment that is associated with the security system information

408

Generating, for display on a user interface, an AR object of the first AR effect at the three-dimensional location

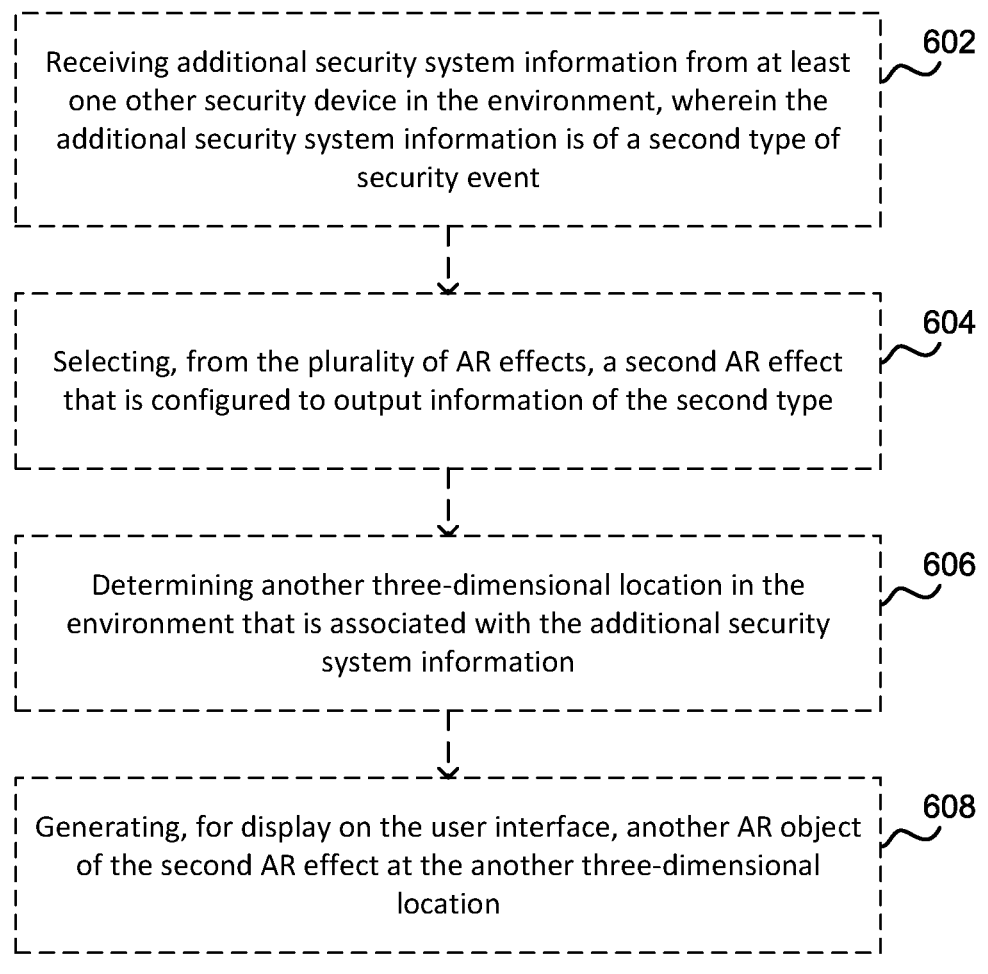

400

Receiving additional security system information from at least one other security device in the environment, wherein the additional security system information is of a second type of security event

602

Selecting, from the plurality of AR effects, a second AR effect that is configured to output information of the second type

604

Determining another three-dimensional location in the environment that is associated with the additional security system information

606

Generating, for display on the user interface, another AR object of the second AR effect at the another three-dimensional location

SYSTEMS AND METHODS FOR PROVIDING SECURITY SYSTEM INFORMATION USING AUGMENTED REALITY EFFECTS

TECHNICAL FIELD

The described aspects relate to security systems.

BACKGROUND

Conventional user interfaces that convey security information such as surveillance are cumbersome. If several views of a monitored environment are presented to a security officer, he/she may be unable to find individual issues in each view. For example, if the environment is an office building and an officer is monitoring multiple offices simultaneously, a missing laptop in one view may go unnoticed by the officer. On the other hand, if such alerts (e.g., changes in frames) are provided by the user interface automatically—for example as text alerts, the alerts may be too many and may overwhelm the officer. Such user interfaces also fail to provide relevant information in these alerts. For example, an alert may be a text that states "a fire is detected in the cafeteria." Such an alert may fail to provide information about where the fire is located inside the cafeteria and the size of the fire.

Accordingly, improvements in conveying security information are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate generally to security systems, and more particularly, to providing security system information using augmented reality effects.

An example aspect includes a method for providing security system information using an augmented reality (AR) effect, comprising receiving security system information from at least one security device in an environment, wherein the security system information is of a first type of security event. The method further includes selecting, from a plurality of AR effects, a first AR effect that is configured to output information of the first type. Additionally, the method further includes determining a three-dimensional location in the environment that is associated with the security system information. Additionally, the method further includes generating, for display on a user interface, an AR object of the first AR effect at the three-dimensional location.

Another example aspect includes an apparatus for providing security system information using an augmented reality (AR) effect, comprising a memory and a processor coupled with the memory. The processor is configured to receive security system information from at least one security device in an environment, wherein the security system information is of a first type of security event. The processor is further configured to select, from a plurality of AR effects, a first AR effect that is configured to output information of the first type. Additionally, the processor further configured to determine a three-dimensional location in the environment that is associated with the security system information. Additionally, the processor further configured to generate, for display on a user interface, an AR object of the first AR effect at the three-dimensional location.

Another example aspect includes an apparatus for providing security system information using an augmented reality (AR) effect, comprising means for receiving security system information from at least one security device in an environment, wherein the security system information is of a first type of security event. The apparatus further includes means for selecting, from a plurality of AR effects, a first AR effect that is configured to output information of the first type. Additionally, the apparatus further includes means for determining a three-dimensional location in the environment that is associated with the security system information. Additionally, the apparatus further includes means for generating, for display on a user interface, an AR object of the first AR effect at the three-dimensional location.

Another example aspect includes a computer-readable medium comprising stored instructions for providing security system information using an augmented reality (AR) effect, wherein the instructions are executable by a processor to receive security system information from at least one security device in an environment, wherein the security system information is of a first type of security event. The instructions are executable by a processor to select, from a plurality of AR effects, a first AR effect that is configured to output information of the first type. Additionally, the instructions are executable by a processor to determine a three-dimensional location in the environment that is associated with the security system information. Additionally, the instructions are executable by a processor to generate, for display on a user interface, an AR object of the first AR effect at the three-dimensional location.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 is a flowchart of a method for providing security system information using an augmented reality (AR) effect.

FIG. 6 is a flowchart of additional aspects of the method of FIG. 4.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As discussed previously, security incidents (e.g., missed and dispositioned objects) may be overlooked with text-based alerts and notifications. The quick attention of alerts and notifications by security guards are extremely valuable in the security domain.

The present disclosure describes providing security system information using augmented reality (AR) effects. AR effects are useful in providing customizable visual cues to users. For example, in the event of a fire, the present disclosure describes a security software component that generates a user interface (UI) with an AR object located where the fire is detected. This AR object may simply be an arrow or a complex animation depicting a firefighter standing near the fire. Because AR effects utilize three-dimensional information, the security information conveyed using aspects of the present disclosure quickly provide users with visually distinct objects at the locations associated with the alert. This results in easier access to important information and improved response times by the users, such as but not limited to security officers.

The present disclosure describes adding an immersive UI experience and visual representations using AR technology. This involves augmenting alarms/alerts/events as virtual objects on, for example, live stream video to give more attention to security operators. In terms of dispositioned objects, the present disclosure describes using artificial intelligence (AI) models to identify objects and store their positions in a time series database. Once objects are identified, the UI overlays augmented objects/tags at the missed/dispositioned object's place.

Figure 1:
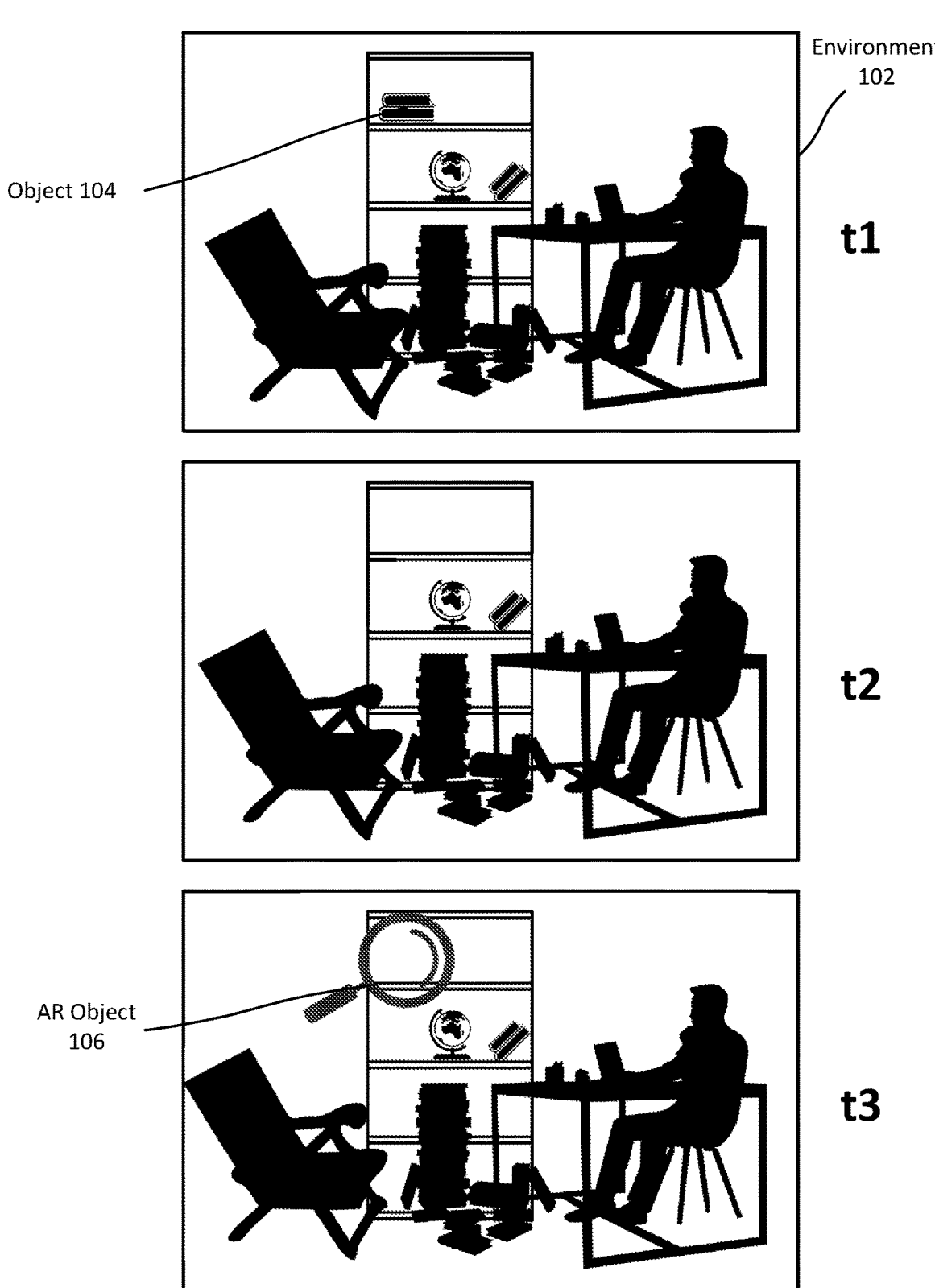
FIG. 1 is a diagram of different frames depicting a dispositioned object, in accordance with exemplary aspects of the present disclosure.

FIG. 1 is a diagram 100 of different frames depicting a dispositioned object, in accordance with exemplary aspects of the present disclosure. For example, a camera may be placed in environment 102 (e.g., an office). A computing device may receive frames at times t1, t2, and t3 from the camera. Through the course of the frames, object 104 may be dispositioned. For example, object 104 may be a book placed on the shelf of environment 102. Object 104 may be monitored by a security software component because it is manually tagged/marked as an object of interest on a user interface by a user. At time t1, object 104 is visible in the frame. At time t2, object 104 is no longer visible. At time t3, AR object 106 is generated in the frame in the location where object 104 once was. AR object 106 may be part of an AR effect that depicts a magnifying glass in the last known location of object 104. An officer monitoring environment 102 may be shown AR object 106 on the frame at time t3 to bring attention to the fact that object 104 is no longer visible in the frame. The frame captured at time t3 with AR object 106 may be presented on a user interface of a security software component (e.g., a security application) installed on the computing device. An exemplary security software component is described in FIG. 3.

Figure 2:
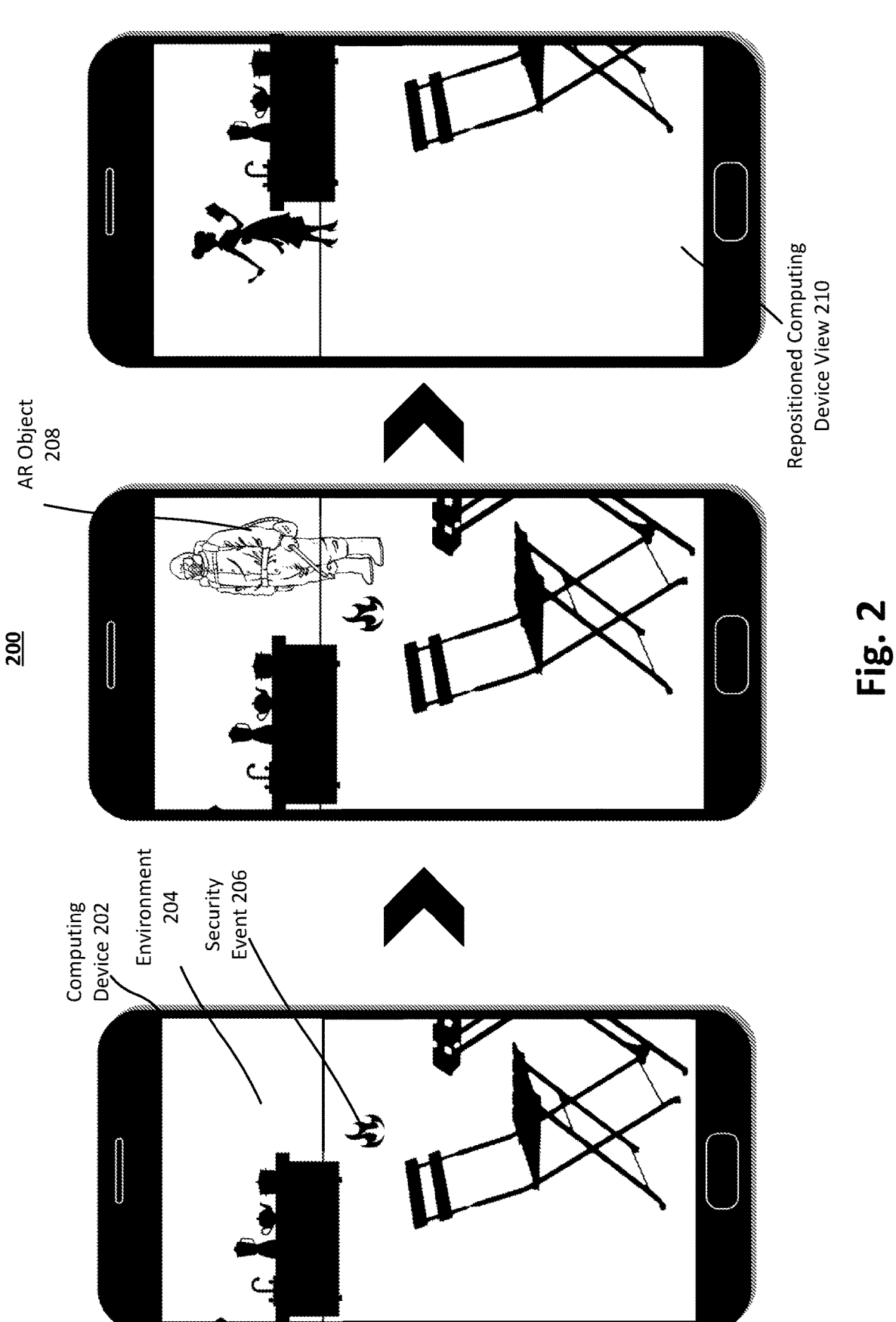
FIG. 2 is a diagram of a scenario for viewing AR objects on a computing device, in accordance with exemplary aspects of the present disclosure.

FIG. 2 is a diagram 200 of a scenario for viewing AR objects on a computing device, in accordance with exemplary aspects of the present disclosure. Unlike static images that are overlaid over frames—typically overwriting the respective pixel values of each respective frame—overlaying an AR object is more complex. This is because an AR object may have motion attributes that cause the AR object to move over multiple frames (thus the same overwritten pixel values are not kept over multiple frames).

Furthermore, AR objects may have placement attributes that anchor an AR object to a specific location. For example, in FIG. 2, computing device 202 may be used to view a security event alert on a user interface of the security software component. Security event 206 may be a fire that is occurring in environment 204. For example, a security software component may receive an indication from one or more sensors (e.g., carbon monoxide detectors, thermometers, thermostats, etc.) that a fire is occurring. The security software component may determine that because the one or more sensors are located in environment 204 (e.g., a cafeteria), security event 206 (i.e., the fire) is located in environment 204 as well. Using security surveillance cameras in environment 204, the security software component may, for example, triangulate a location of the fire using object detection.

In some aspects, the determination of the location of security event 206 occurs in a server that executes the security software component. The server may execute a thick client application of the security software component that communicates with all sensors in a given environment, identifies security events, and transmits alerts to generate on a user interface. The user interface of the security software component may be part of a thin client application installed on computing device 202. A thick client application performs tasks that demand more processing power than thin client applications. In general, a thin client application usually receives inputs, transfers the inputs to a thick client application for processing, receives an output from the thick client application, and provides the output to the user (e.g., through a user interface).

If computing device 202 is a computer connected to a stationary camera such as a surveillance camera, a user may continuously view AR object 208, on the thin client application, in the frame location where security event 206 is detected until security event 206 is resolved. However, if computing device 202 is connected to a camera that is movable (e.g., a smartphone or a movable surveillance camera), AR object 208 may not always be visible if the user moves computing device 202. For example, repositioned computing device view 210 shows a part of environment 204 that does not face security event 206. Accordingly, AR object 208 is not visible. As a camera of computing device 202 returns towards security event 206, AR object 208 may become visible again on the user interface. In this case, AR object 208 may be an animation of a firefighter or a contamination specialist pointing at the fire.

Figure 3:
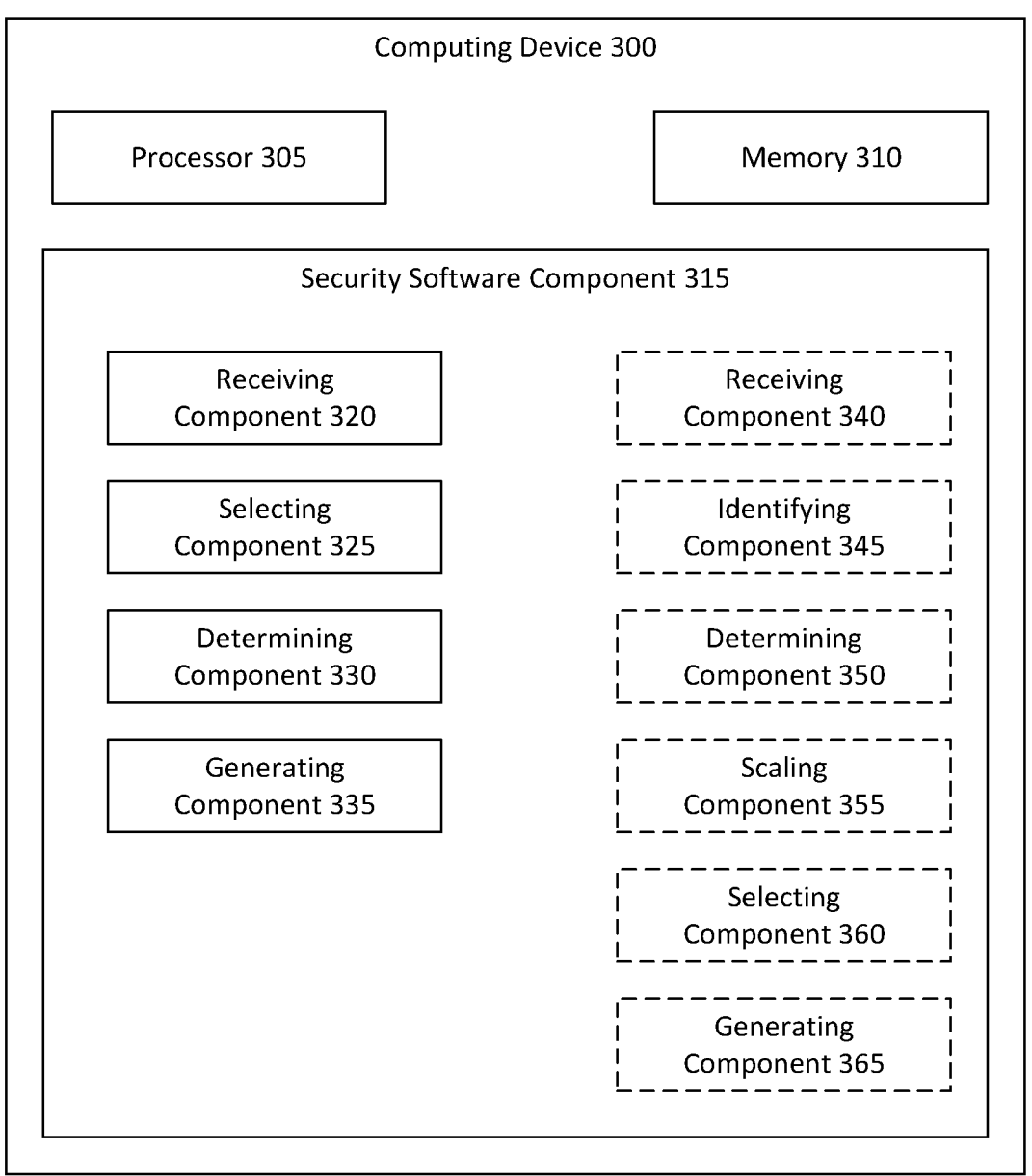
FIG. 3 is a block diagram of an example of a computer device having components configured to perform a method for providing security system information using an augmented reality (AR) effect.

Referring to FIG. 3 and FIG. 4, in operation, computing device 300 may perform a method 400 of wireless communication, by such as via execution of security software component 315 by processor 305 and/or memory 310. FIG. 3 is a block diagram of an example of computing device 300 having components configured to perform a method for providing security system information using an augmented reality (AR) effect. FIG. 4 is a flowchart of method 400 for providing security system information using an augmented reality (AR) effect.

At block 402, the method 400 includes receiving security system information from at least one security device in an environment, wherein the security system information is of a first type of security event. For example, in an aspect, computing device 300, processor 305, memory 310, security software component 315, and/or receiving component 320 may be configured to or may comprise means for receiving security system information from at least one security device in an environment, wherein the security system information is of a first type of security event.

A security device may be any device that monitors an attribute of the environment and is capable of communicating with computing device 300. For example, the at least one security device may be a surveillance camera that monitors a visual scene of the environment. Other examples of security devices may be thermometers, water moisture detectors, badge scanners, carbon monoxide detectors, etc. For example, the at least one security device and computing device 300 may be connected to the same local area network (LAN) or wide area network (WAN). This enables receiving component 320 to receive updates comprising security system information from the security device(s).

Selecting component 325 may refer to an AR database that includes a plurality of AR effects. Each AR effect in the database may be mapped to a security event. For example, a first AR effect may include an animation of a girl pointing. This AR effect may be mapped to the first type of security event (e.g., motion detection). The AR object in this AR effect is the girl. The motion attributes may indicate a pointing motion. The placement attributes may indicate that the AR object is to be placed at least 40 units away from a location of the security event such that the pointing motion is directed towards the security event.

A high-level example of the AR database is shown below. It should be noted that the descriptions of the motion and placement attributes and the AR object are described at a high-level. In practical execution, the fields in the AR database may include code and images, respectively.

TABLE 1

| AR EFFECT | AR OBJECT | SCALE | MOTION | PLACEMENT | EVENT TYPE |
|---|---|---|---|---|---|
| Motion Alert | Girl | 0.5 X Frame | Pointing | (X = 40 units from security event, Y = 0, Z = 100) | Motion Detection |
| Lost? | Magnifying Glass | 2:1 Dispositioned Object | Circular | (X = 0 units from security event, Y = 0, Z = 100) | Disposition |
| Fire Emergency | Firefighter; Hose; Water | 0.4 X Frame | Firefighter points hose and water exits from hose | (X = 0, Y = 40 units from security event, Z = 10) | Fire |
| . . . | . . . | | . . . | . . . | . . . |

Receiving component 320 may further classify security system information into different event types. For example, a first type of security system information may be motion detection. For example, the security system information may include two or more frames depicting an environment and there may be difference between the two or more frames. A second type of event may be a fire event, where the security system information may include any combination of temperature readings, carbon monoxide readings, and frames depicting a fire. A third type of event may be a water event, where the security system information may include any combination of moisture detection readings, frames depicting water, and plumbing sensors. These are just a few examples of security events. Other security events may include a security breach (e.g., unauthorized entry after a failed badge scan), an evacuation (e.g., detected by a manual alarm), an object disposition, etc.

At block 404, the method 400 includes selecting, from a plurality of AR effects, a first AR effect that is configured to output information of the first type. For example, in an aspect, computing device 300, processor 305, memory 310, security software component 315, and/or selecting component 325 may be configured to or may comprise means for selecting, from a plurality of AR effects, a first AR effect that is configured to output information of the first type.

An AR effect includes at least one AR object, motion attributes, and placement attributes. The motion attributes describe how the AR object moves in a frame. The placement attributes describe how the AR object is placed in a frame. In some aspects, the motion and placement attributes may be portions of code that are executed to generate the AR effect. In an alternative or additional aspect, the AR object is an alert that indicates an occurrence of a security event described in the security system information.

In table 1, the placement attributes are relative to the location of the security event. For example, the firefighter associated with a fire event is placed relative to the location of the fire. Likewise, the magnifying glass associated with a disposition event is placed relative to the location of the dispositioned object. Because AR objects give the illusion of three-dimensions even when viewed on a two-dimensional screen, the placement in table 1 is described as a three-dimensional location. Each AR object has a depth in addition to a length and width. For example, the placement (X=40 units from security event, Y=0, Z=100) suggests that each AR object is to be placed such that a center point of the AR object is 40 units (e.g., inches) away from the three-dimensional location of the security event along the X-axis, 0 units away along the Y-axis and 100 units away along the Z-axis. The table also includes a scale column that indicates the size of the AR effect. For example, the AR object indicating the dispositioned object should be twice as large as the dispositioned object. In another example, the AR object indicating the fire should have a height that covers 40% of the frame length.

It should be noted that the contents of table 1 are solely examples. A developer may adjust the AR objects in terms of look, motion, size, placement, etc., how she/he wishes. A user may also adjust the contents of the AR database such that the alerts are personalized. For example, a user may wish for the firefighter to be larger in order to better identify small fires/smoke.

At block 406, the method 400 includes determining a three-dimensional location in the environment that is associated with the security system information. For example, in an aspect, computing device 300, processor 305, memory 310, security software component 315, and/or determining component 330 may be configured to or may comprise means for determining a three-dimensional location in the environment that is associated with the security system information.

Suppose that computing device 300 is computing device 202 from FIG. 2. In one example, in order to determine the three-dimensional location associated with the security system information (i.e., the location of the fire indicated by security event 206), a user may be prompted to move computing device 202 (e.g., a smartphone with a built-in camera) around environment 204. As the user pans computing device 202, security software component 315 may capture image frames and may subsequently use object detection (i.e., a computer vision technique and/or a machine learning algorithm that detects a particular object such as a fire) to identify the fire in at least one frame. Based on the movement of computing device 202 and displacement of objects across the captured image frames (e.g., the chairs, the tables, etc.), security software component 315 may determine a relative position of the fire.

For example, a point on the fire may be at position (X1, Y1, Z1). This represents that the point is X1 points away from an origin point along the X-axis, Y1 points away from an origin point along the Y-axis, and Z1 points away from an origin point along the Z-axis. Suppose the position of the camera is treated as the origin point. Referring to FIG. 2, the a point on the chair may be located at position (−20, 0, 20) and a point on the fire may be located at (−30, 5, 100). These numbers may be in any units including pixels, feet, inches, etc. For example, the positions suggest that the chair is 20 units below, 0 units to the side, and 20 units away from the camera, whereas the fire is 30 units below, 5 units to the right, and 100 units away from the camera of computing device 202.

In the example where the camera is fixed and cannot be moved, the distances between objects and the camera may be pre-programmed.

It should be noted that the values described above are single points on the object. For example, the fire may have several hundred points, each a certain distance away from the camera. The combination of these points equals the three-dimensional location associated with the security system information. In other words, if the fire is made up of 100 positions, the location of the fire is any combination of the points. In some aspects, a single central point may be used to identify the three-dimensional location. In other aspects, the points that make up the boundary are considered the three-dimensional location. In yet another aspect, a simplified boundary (e.g., a rectangular prism) that includes at least six points (one on each side of the prism) of the fire and fully encompasses the fire is considered the three-dimensional location.

At block 408, the method 400 includes generating, for display on a user interface, an AR object of the first AR effect at the three-dimensional location. For example, in an aspect, computing device 300, processor 305, memory 310, security software component 315, and/or generating component 335 may be configured to or may comprise means for generating, for display on a user interface, an AR object of the first AR effect at the three-dimensional location.

For example, based on the placement attributes of the AR effect, the AR object may be placed in a frame depicting the environment relative to the three-dimensional location. Referring to FIG. 2 and table 1, for example, a firefighter is positioned based on the attribute (X=0, Y=40 units from security event, Z=10). Accordingly, the firefighter is at the height of the fire, is 40 units to the right, and 10 units behind the fire.

In an alternative or additional aspect, the security system information indicates that an object in the environment has been dispositioned, wherein the first type of security event is a dispositioned object event, and wherein the three-dimensional location is a last known location of the object in the environment. In an aspect, the AR object is an animation that points to the three-dimensional location and visually indicates that the object is missing. For example, in FIG. 1, the magnifying glass AR object is placed in the area where the object was previously located. In some aspects, security software component 315 may execute an artificial intelligence algorithm (e.g., machine learning, deep learning, etc.) that monitors a frame, classifies each object in the frame, and determines how often the position of an object is changed. If an object remains in its position for more than a threshold amount of frames, it is likely that the object should remain the environment. If the object location is changed, security software component 315 may generate the AR object (e.g., an exclamation point) on the area where the object was last detected by the artificial intelligence algorithm. In an aspect, the AR object is a graphic representation of the object that is missing located at the three-dimensional location.

In an alternative or additional aspect, the user interface is displayed on a computing device with a camera, and wherein the AR object is locked at the three-dimensional location such that moving the camera away from the three-dimensional location removes the AR object from the user interface and repositioning the camera towards the three-dimensional location generates the AR object on the user interface. This is depicted in FIG. 2, where AR object 208 is no longer visible when computing device 202 is faced towards a different part of environment 204 (i.e., repositioned computing device view 210).

In an alternative or additional aspect, the security system information indicates that motion has been detected, and wherein generating the AR object at the three-dimensional location comprises generating an AR object where the motion is detected.

Figure 5:
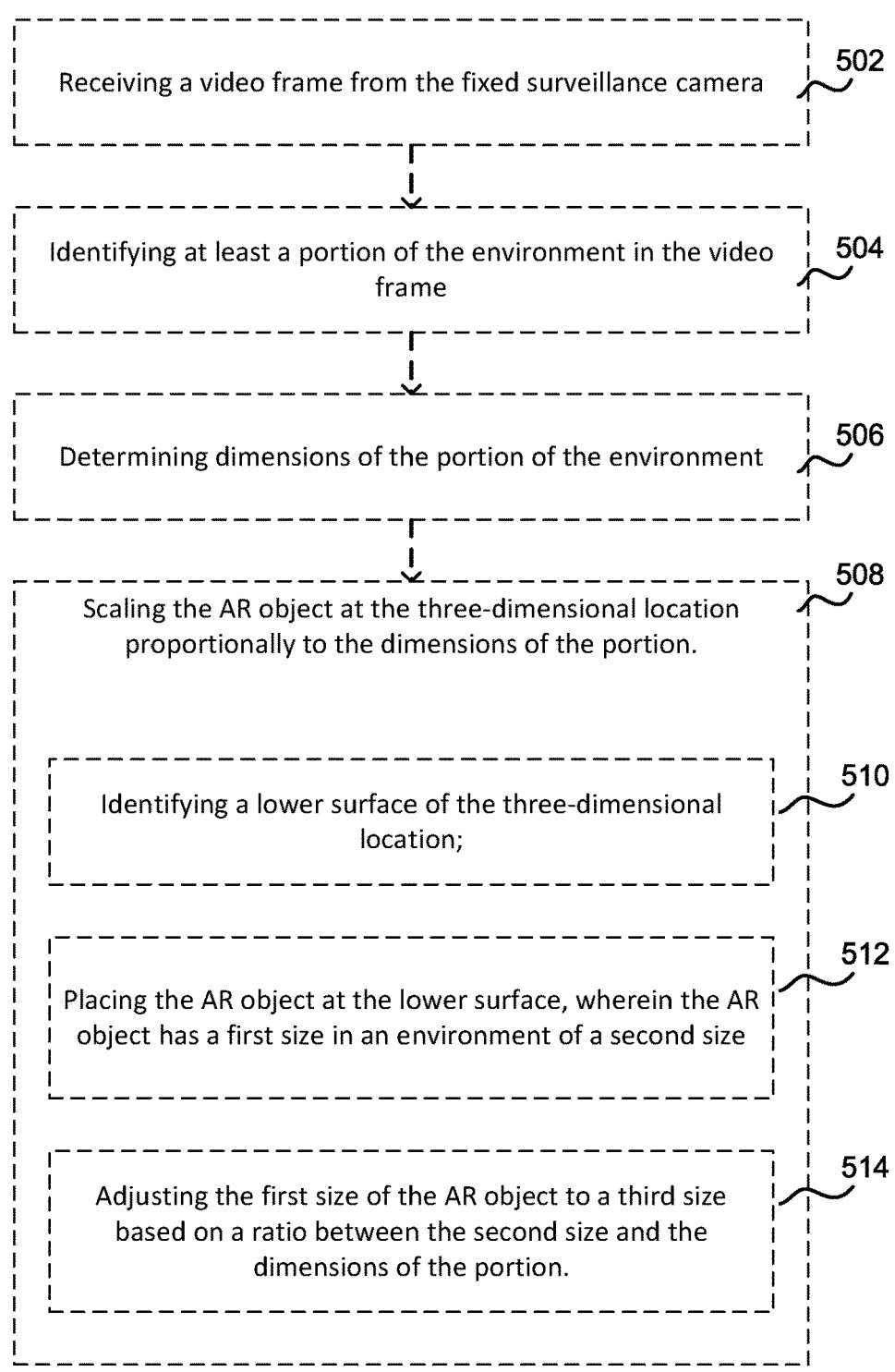
FIG. 5 is a flowchart of additional aspects of the method of FIG. 4.

Referring to FIG. 5, in an alternative or additional aspect wherein the at least one security device is a fixed surveillance camera, at block 502, the generating at block 408 of the AR object may further include receiving a video frame from the fixed surveillance camera. For example, in an aspect, computing device 300, processor 305, memory 310, security software component 315, and/or receiving component 340 may be configured to or may comprise means for receiving a video frame from the fixed surveillance camera.

In this optional aspect, at block 504, the generating at block 408 of the AR object may further include identifying at least a portion of the environment in the video frame. For example, in an aspect, computing device 300, processor 305, memory 310, security software component 315, and/or identifying component 345 may be configured to or may comprise means for identifying at least a portion of the environment in the video frame.

For example, the environment may be an entire office building. Identifying component 345 may detect that the portion of the environment is the cafeteria based on metadata associated with the surveillance camera. The metadata may, for example, indicate that the camera is fixed in the cafeteria.

In this optional aspect, at block 506, the generating at block 408 of the AR object may further include determining dimensions of the portion of the environment. For example, in an aspect, computing device 300, processor 305, memory 310, security software component 315, and/or determining component 350 may be configured to or may comprise means for determining dimensions of the portion of the environment.

For example, determining component 350 may retrieve, from a locations database, dimensions of the cafeteria. The locations database may include room sizes, room maps, and object positions. Using this information, determining component 350 may determine the proportions of the objects in the portion to the dimensions of the portion.

In this optional aspect, at block 508, the generating at block 408 of the AR object may further include scaling the AR object at the three-dimensional location proportionally to the dimensions of the portion. For example, in an aspect, computing device 300, processor 305, memory 310, security software component 315, and/or scaling component 355 may be configured to or may comprise means for scaling the AR object at the three-dimensional location proportionally to the dimensions of the portion.

For example, scaling component 355 may determine that the cafeteria has a height such that the ceiling is 10 feet away from the lower surface (i.e., the floor). If AR database indicates that the height of the AR object is to be 40% of the frame and the 10 feet accounts for 100% of the frame along the X-axis, then scaling component 355 may calculate the size of the AR object to be 4 feet tall.

In this optional aspect, at block 512, the scaling at block 508 of the AR object comprises placing the AR object at the lower surface, wherein the AR object has a first size in an environment of a second size. For example, the bottom most point of the AR object may be placed on a flat surface on the lower portion of the frame (i.e., the lower surface). This surface may represent a floor, a table top, a bed top, a chair seat, etc. Referring to the example given before, the first size is 40% of a frame and the second size is 10 feet.

In this optional aspect, at block 514, the scaling at block 508 of the AR object comprises adjusting the first size of the AR object to a third size based on a ratio between the second size and the dimensions of the portion. Referring again to the previous example, the third size is 4 feet (i.e., 40% of 10 feet).

Referring to FIG. 6, in an alternative or additional aspect, at block 602, the method 400 may further include receiving additional security system information from at least one other security device in the environment, wherein the additional security system information is of a second type of security event. For example, in an aspect, computing device 300, processor 305, memory 310, security software component 315, and/or receiving component 340 may be configured to or may comprise means for receiving additional security system information from at least one other security device in the environment, wherein the additional security system information is of a second type of security event (e.g., a dispositioned object).

In this optional aspect, at block 604, the method 400 may further include selecting, from the plurality of AR effects, a second AR effect that is configured to output information of the second type. For example, in an aspect, computing device 300, processor 305, memory 310, security software component 315, and/or selecting component 360 may be configured to or may comprise means for selecting, from the plurality of AR effects, a second AR effect that is configured to output information of the second type (e.g., the magnifying glass).

In this optional aspect, at block 606, the method 400 may further include determining another three-dimensional location in the environment that is associated with the additional security system information. For example, in an aspect, computing device 300, processor 305, memory 310, security software component 315, and/or determining component 350 may be configured to or may comprise means for determining another three-dimensional location in the environment that is associated with the additional security system information.

In this optional aspect, at block 608, the method 400 may further include generating, for display on the user interface, another AR object of the second AR effect at the another three-dimensional location. For example, in an aspect, computing device 300, processor 305, memory 310, security software component 315, and/or generating component 365 may be configured to or may comprise means for generating, for display on the user interface, another AR object of the second AR effect at the another three-dimensional location.

In an alternative or additional aspect, the three-dimensional location and the another three-dimensional location are within a threshold distance, and wherein the AR object and the another AR object are configured to be displayed simultaneously on the user interface.

In an alternative or additional aspect, the three-dimensional location and the another three-dimensional location are not within a threshold distance, and wherein the AR object and the another AR object are configured to not be displayed simultaneously on the user interface. Suppose that a fire engulfs a portion of an environment and causes different objects previously present in the frame to fall/burn. Security software component 315 would be tasked with identifying the locations where the objects of interest (now missing) were last known to be located, along with identifying the location of the fire. In this scenario, both the firefighter and the magnifying glass AR objects would be generated. As computing device 202 is panned across the environment, both AR objects may be visible simultaneously. However, if the objects are too far apart such that they do not fit in one frame (e.g., the locations associated with the security events are not within a threshold distance from one another), the AR objects may only be shown one at a time when the computing device 202 is faced towards the respective three-dimensional location.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing security system information using an augmented reality (AR) effect, comprising:

receiving security system information from at least one security device in an environment, wherein the at least one security device is a surveillance camera, and wherein the security system information is of a first type of security event;

selecting, from a plurality of AR effects, a first AR effect that is configured to output information of the first type;

determining a three-dimensional location in the environment that is associated with the security system information;

determining dimensions of a portion of the environment captured in a video frame by the surveillance camera;

generating, for display on a user interface, an AR object of the first AR effect at the three-dimensional location; and scaling the AR object at the three-dimensional location based on the dimensions of the portion, wherein the AR object has a first size in the environment, wherein the environment is of a second size, by:

adjusting the first size of the AR object to a third size based on a ratio between the second size and the dimensions of the portion.

2. The method of claim 1, wherein the security system information indicates that an object in the environment has been dispositioned, wherein the first type of security event is a dispositioned object event, and wherein the three-dimensional location is a last known location of the object in the environment.

3. The method of claim 2, wherein the AR object is an animation that points to the three-dimensional location and visually indicates that the object is missing.

4. The method of claim 2, wherein the AR object is a graphic representation of the object that is missing located at the three-dimensional location.

5. The method of claim 1, wherein the AR object is an alert that indicates an occurrence of a security event described in the security system information.

6. The method of claim 1, wherein the security system information indicates that motion has been detected, and wherein generating the AR object at the three-dimensional location comprises generating the AR object where the motion is detected.

7. The method of claim 1, wherein the user interface is displayed on a computing device with a camera, and wherein the AR object is locked at the three-dimensional location such that moving the camera away from the three-dimensional location removes the AR object from the user interface and repositioning the camera towards the three-dimensional location generates the AR object on the user interface.

8. The method of claim 1, further comprising:

receiving additional security system information from at least one other security device in the environment, wherein the additional security system information is of a second type of security event;

selecting, from the plurality of AR effects, a second AR effect that is configured to output information of the second type;

determining another three-dimensional location in the environment that is associated with the additional security system information; and generating, for display on the user interface, another AR object of the second AR effect at the another three-dimensional location.

9. The method of claim 8, wherein the three-dimensional location and the another three-dimensional location are within a threshold distance, and wherein the AR object and the another AR object are configured to be displayed simultaneously on the user interface.

10. The method of claim 8, wherein the three-dimensional location and the another three-dimensional location are not within a threshold distance, and wherein the AR object and the another AR object are configured to not be displayed simultaneously on the user interface.

11. An apparatus for providing security system information using an augmented reality (AR) effect, comprising:

a memory; and a processor coupled with the memory and configured to:

receive security system information from at least one security device in an environment, wherein the at least one security device is a surveillance camera, and wherein the security system information is of a first type of security event;

select, from a plurality of AR effects, a first AR effect that is configured to output information of the first type;

determine a three-dimensional location in the environment that is associated with the security system information;

determine dimensions of a portion of the environment captured in a video frame by the surveillance camera;

generate, for display on a user interface, an AR object of the first AR effect at the three-dimensional location; and scale the AR object at the three-dimensional location based on the dimensions of the portion, wherein the AR object has a first size in the environment, wherein the environment is of a second size, by:

adjusting the first size of the AR object to a third size based on a ratio between the second size and the dimensions of the portion.

12. The apparatus of claim 11, wherein the security system information indicates that an object in the environment has been dispositioned, wherein the first type of security event is a dispositioned object event, and wherein the three-dimensional location is a last known location of the object in the environment.

13. The apparatus of claim 12, wherein the AR object is an animation that points to the three-dimensional location and visually indicates that the object is missing.

14. The apparatus of claim 12, wherein the AR object is a graphic representation of the object that is missing located at the three-dimensional location.

15. The apparatus of claim 11, wherein the AR object is an alert that indicates an occurrence of a security event described in the security system information.

16. The apparatus of claim 11, wherein the security system information indicates that motion has been detected, and wherein to generate the AR object at the three-dimensional location comprises to generate the AR object where the motion is detected.

17. The apparatus of claim 11, wherein the user interface is displayed on a computing device with a camera, and wherein the AR object is locked at the three-dimensional location such that moving the camera away from the three-dimensional location removes the AR object from the user interface and repositioning the camera towards the three-dimensional location generates the AR object on the user interface.

18. The apparatus of claim 11, wherein the processor is further configured to:

receive additional security system information from at least one other security device in the environment, wherein the additional security system information is of a second type of security event;

select, from the plurality of AR effects, a second AR effect that is configured to output information of the second type;

determine another three-dimensional location in the environment that is associated with the additional security system information; and generate, for display on the user interface, another AR object of the second AR effect at the another three-dimensional location.

19. The apparatus of claim 18, wherein the three-dimensional location and the another three-dimensional location are within a threshold distance, and wherein the AR object and the another AR object are configured to be displayed simultaneously on the user interface.

20. The apparatus of claim 18, wherein the three-dimensional location and the another three-dimensional location are not within a threshold distance, and wherein the AR object and the another AR object are configured to not be displayed simultaneously on the user interface.

* * * * *